United States Patent [19]
Ostermann et al.

[11] Patent Number: 5,878,672
[45] Date of Patent: Mar. 9, 1999

[54] PORTABLE ORGANIZER DESK FOR USE WHILE TRAVELING

[76] Inventors: Heather M. Ostermann, 4467 Delafield Ct., Roswell, Ga. 30075; Melanie M. Macintyre, 2709 Raven Trail, Marietta, Ga. 30066

[21] Appl. No.: 880,985

[22] Filed: Jun. 23, 1997

[51] Int. Cl.[6] .................................................. A47B 23/00
[52] U.S. Cl. ........................ 108/44; 108/25; 297/188.06; 297/163
[58] Field of Search .................................. 108/44, 45, 25; 297/188.01, 188.06, 188.07, 163; 224/275; 190/901.8, 901, 902, 109, 110

[56] References Cited

U.S. PATENT DOCUMENTS

| | | |
|---|---|---|
| 841,902 | 1/1907 | Shumard . |
| 1,754,663 | 4/1930 | Adams . |
| 2,822,968 | 2/1958 | Jackson .................................. 224/275 |
| 4,466,659 | 8/1984 | Carpentier et al. ................. 297/188.06 |
| 4,595,086 | 6/1986 | Simpson . |
| 4,597,605 | 7/1986 | Gilbert ........................... 297/188.01 X |
| 4,700,634 | 10/1987 | Mills et al. . |
| 4,822,309 | 4/1989 | Vandenberg ................... 297/188.01 X |
| 4,843,662 | 7/1989 | Handelman .................... 297/188.01 X |
| 4,958,577 | 9/1990 | Demaio et al. . |
| 5,081,936 | 1/1992 | Drieling . |
| 5,115,893 | 5/1992 | Terkildsen . |
| 5,188,421 | 2/1993 | Arseneault . |
| 5,443,018 | 8/1995 | Cromwell . |
| 5,447,215 | 9/1995 | Volkmar et al. . |
| 5,460,102 | 10/1995 | Pasmanick . |
| 5,467,853 | 11/1995 | Pelletier . |
| 5,642,674 | 7/1997 | Joye, Sr. et al. ....................... 108/25 X |
| 5,658,314 | 8/1997 | Scheffer et al. ................. 224/901.8 X |
| 5,680,973 | 10/1997 | Vulpitta et al. ....................... 108/43 X |

OTHER PUBLICATIONS

Auto–shade, L.L.C., Moorpark, CA, Backseat Travel Tray, 1996.

*Primary Examiner*—Peter M. Cuomo
*Assistant Examiner*—Hanh V. Tran
*Attorney, Agent, or Firm*—Kennedy, Davis & Kennedy

[57] ABSTRACT

A portable organizer desk 10 comprising a sheet 12 of a substantially planar flexible material, a pair of elongate handle straps 34, 35 attached to the sheet on a first fold line 36 defining a first panel 72 and a second panel 97 in the sheet, a pair of loops 104, 105 attached to the sheet along a second fold line 39 defining a third panel 103, a pair of connecting straps 50, 51 attached to the sheet in the second panel, a plurality of pockets 56, 57, and 106 detachably connected to the sheet in the third panel, and a lapboard 52 detachably connected to the connecting straps, the lapboard having an activity surface 53 and an opposing padded surface 54, the pair of connecting straps permitting the lapboard to be selectively moved between a first position against the second panel of the sheet and a second position extending outwardly therefrom, and the lapboard detachably securing in the first position.

10 Claims, 6 Drawing Sheets

5,878,672

PORTABLE ORGANIZER DESK FOR USE WHILE TRAVELING

TECHNICAL FIELD

This invention relates generally to portable desks for use while travelling. More particularly, the present invention relates to portable organizer desks for use, especially by children, while travelling in automobiles.

BACKGROUND OF THE INVENTION

In their simpler form, portable desks have comprised flat roll-up trays such as that seen in U.S. Pat. No. 4,958,577 and lapboards with cupholders and small storage compartments such as those seen in U.S. Pat. Nos. 5,081,936 and 5,460,102. Portable desks have also comprised children's activity cases such as that seen in U.S. Pat. No. 5,467,853. These simple desks have provided minimal, if any, storage and organization capabilities.

In a more complex form, portable desks have comprised adult-oriented work station configurations such as those seen in U.S. Pat. Nos. 4,595,086 and 4,700,634. These complex desk configurations have required the manipulation of support legs and electric lamps.

In another form, folding trays have been made to attach to harnesses mounted to car seats as in U.S. Pat. No. 5,433,018. In still another form, feeding devices for young children have been made to anchor one end about the waist of a child and to attach another end to a car seat headrest as seen in U.S. Pat. No. 5,188,421.

Prior to now, portable desks for use in automobiles have not provided for organizing and storing toys, books, drinks and the like while simultaneously and independently providing an uninterrupted planar writing or playing surface for the child. Portable desks have also not been made for easy removal from a car seat and for readily being carried by a child or other person while also containing a child's tools and books. Portable desks have also failed to include movable storage compartments operable by a child or other person. Nor have these known portable desks provided an activity/teaching surface for facilitating interaction between drivers and passengers while travelling.

Accordingly, there remains a need in the art for a portable organizer desk that facilitates organization while being conveniently operable by both a driver and a passenger, and while providing easy access to a writing surface and an activity surface. It is to the provision of such that the present invention is directed.

SUMMARY OF THE INVENTION

The present invention solves the above-described need in the art by providing a portable organizer desk for use by a person while travelling in a car. The desk comprises a sheet of a substantially planar flexible material having a first side and an opposing second side. A pair of elongate handle straps are attached to the first side of the sheet on a first fold line substantially parallel to a transverse axis of the sheet. The first fold line defines a first panel and a second panel in the sheet. Each handle strap has a distal end adapted for detachable mating engagement to the distal end of the other handle strap. A pair of loops are spaced-apart from one another and attached to the first side of the sheet along a second fold line substantially parallel to the first fold line. Each loop defines an opening between the first side and the loop for receiving one of the handle straps therethrough. The second fold line defines a third panel in the sheet and separates the second and third panels. A pair of connecting straps are spaced-apart from one another. Each connecting strap has a first end attached to a side edge portion of the third panel and a distal end extending outwardly therefrom. A plurality of pockets are spacedapart from one another and detachably connected to the second side of the sheet on the second and third panels. Each of the pockets has a selectively openable entry for inserting and removing articles therefrom. A lapboard detachably connects to the distal ends of the pair of connecting straps. The lapboard has an activity surface and an opposing padded surface for cushioning the weight of the lapboard. The pair of connecting straps permits the lapboard to be selectively moved between a first position against the second side of the sheet in the third panel and a second position extending outwardly therefrom. The portable organizer desk has a means for detachably securing the lapboard in the first position for either storing the portable organizer desk while attached to a car seat or carrying the portable organizer desk as a compact package.

Objects, features and advantages of the present invention will become apparent upon reading the following detailed description of the disclosed embodiment of the present invention in conjunction with the appended drawings and claims.

DETAILED DESCRIPTION

Figure 1:
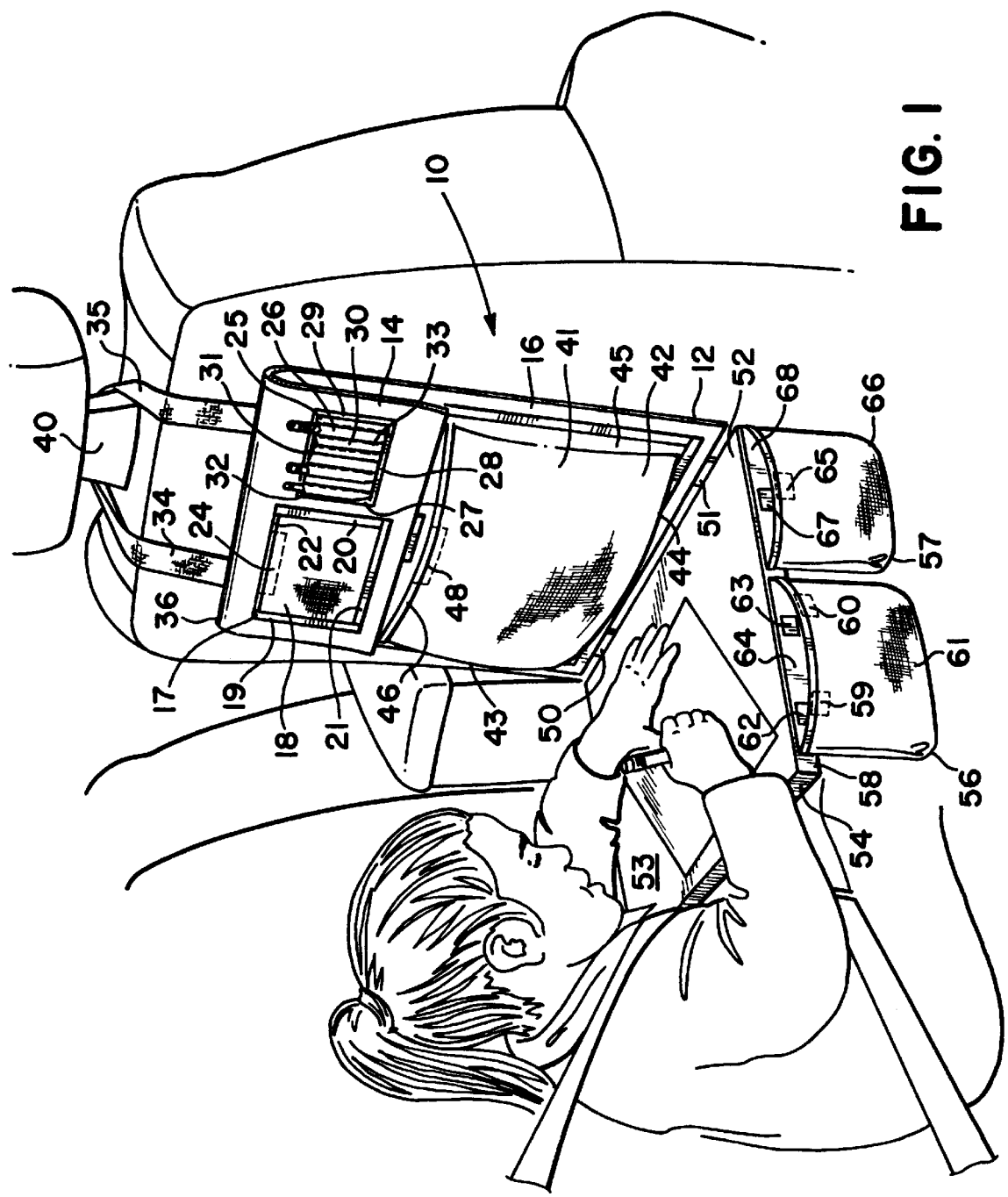
FIG. 1 is a perspective view of a portable organizer desk formed of a lapboard attached to a substantially planar and flexible sheet in use while travelling in an automobile according to the present invention.

Referring now in more detail to the drawings in which like parts shown therein have like identifiers, FIG. 1 is a perspective view of a portable organizer desk 10 in use by a child while travelling in the backseat of a car. The organizer desk 10 includes a sheet 12 of a flexible and foldable material. In a preferred embodiment, the sheet 12 is comprised of two layers of a heavy cloth material such as canvas. Polyfill or polyester filling is preferably included between the two layers of heavy cloth material so as to provide padding and body to the sheet 12. The sheet 12 is substantially planar and rectangular in shape and has a first side 14 and an opposing second side 16. The first side 14 generally defines an exterior face of the sheet 12 when the sheet is folded and the second side 16 generally defines an interior face of the sheet when the sheet is folded, as further discussed below.

A small storage compartment 17 is attached to the first side 14 of the sheet 12. In a preferred embodiment, the small storage compartment 17 is comprised of a flexible cloth-like piece of material 18 that is sewn on three sides 19, 20 and 21 to attach the material at the edges to the sheet 12. A fourth side 22 defines an opening between the sheet 12 and the piece of material 18. A pair of mating fastener pads 24 (shown in phantom) attach to an inside surface of the piece of material 18 along the fourth side 22 and to an opposing portion of the first side 14 of the sheet 12. The pads 24 detachably engage one another for opening and closing the small storage compartment 17.

A pencil holder 25 is attached to the sheet 12 adjacent the small storage compartment 17. In a preferred embodiment, the pencil holder 25 is comprised of a pleated sheet 26 of material of a texture similar to the sheet 12 to which it is attached. The pencil holder 25 is sewn to the sheet on three sides 27, 28 and 29. A plurality of elongated channels 30 extend from the side 28 to a fourth side 32. Each channel 30 is separated from the other channels by at least one line of stitching 33 that attaches the pleated sheet 26 of the pencil holder 25 to the sheet 12. Each channel 30 has an opening 31 located along the fourth side 32 of the pencil holder 25.

Figure 2:
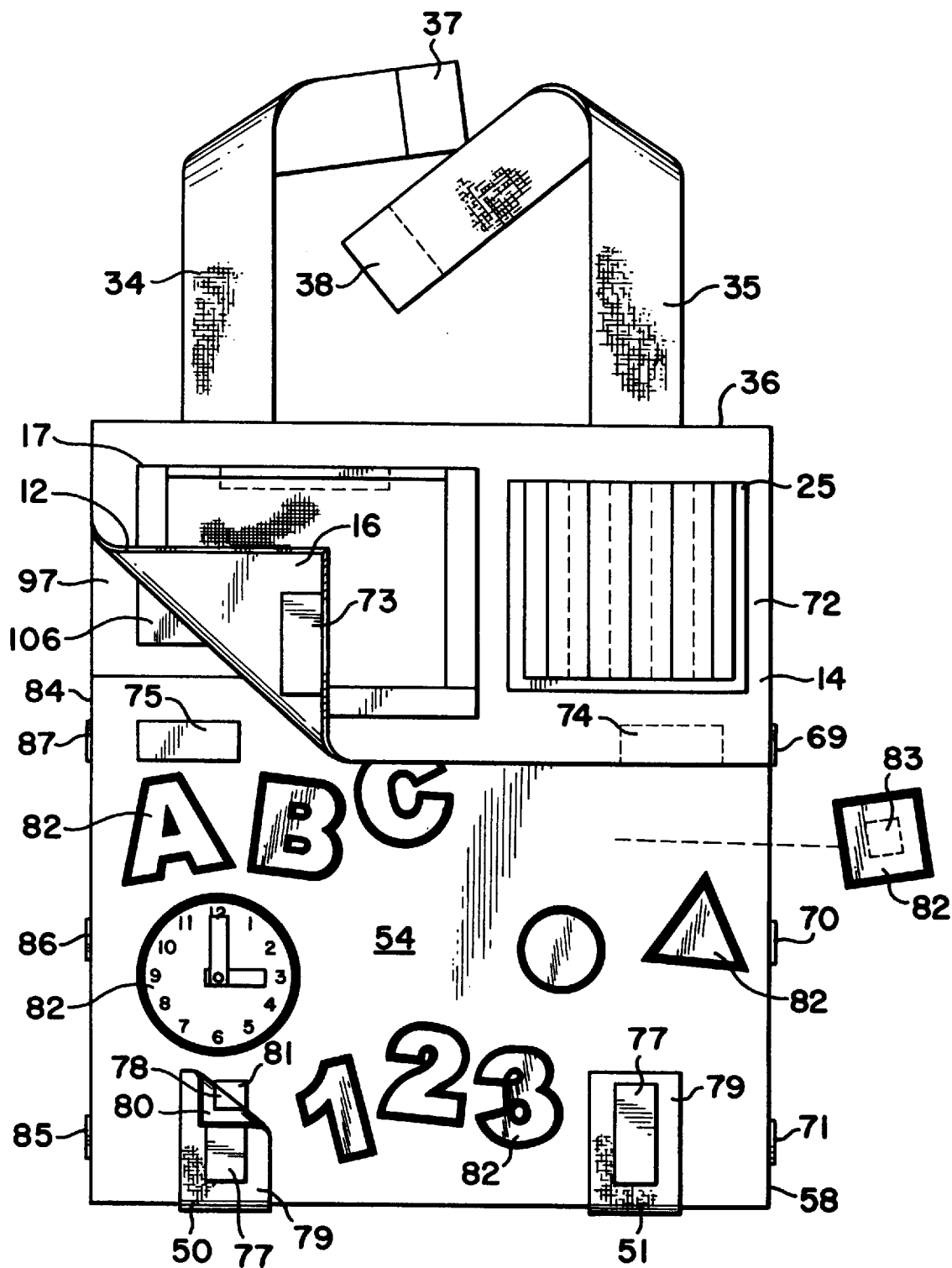
FIG. 2 is a front view of the portable organizer desk of FIG. 1 illustrating the lapboard in an upright position.

A pair of handle straps 34, 35 attach to the first side 14 of the sheet 12 along a line that defines a first fold line 36 substantially parallel to a transverse axis of the sheet 12. In a preferred embodiment, each handle strap 34, 35 is comprised of a woven nylon band. As best illustrated in FIG. 2, a pair of fastener pads 37 and 38 (shown in phantom) are provided at distal ends of the handle straps 34 and 35, respectively. The fastener pads 37 and 38 detachably engage one another such that the handle straps can be fastened together to support the organizer desk 10 from a car seat head rest 40, as shown in FIG. 1. In a preferred embodiment, the fastener pads 34, 35 are mating VELCRO hook and loop pads. However, one of ordinary skill should readily appreciate that other engageable devices may be used, such as snap buttons, button and loop closures, clips, and other such mateable fasteners. The term "pad" as used extensively herein thus refers to mateably engageable fastening devices, and especially to the preferred hook and loop type fasteners.

A large storage compartment 41 attaches to the second side 16 of the sheet 12. The large storage compartment 41 is comprised of a flexible cloth-like piece of material 42 that is sewn on three sides 43, 44 and 45 to the sheet 12. A fourth side 46 defines an opening between the sheet 12 and the piece of material 42. A pair of mating fastener pads 48 (shown in phantom) attach to an inside surface of the piece of material 42 along the fourth side 46 and to an opposing portion of the second side 16 of the sheet 12. The pads 48 detachably engage one another for opening and closing the large storage compartment 41. The large storage compartment 41 is preferably sized for holding large objects such as sweaters, books, toys or the like.

A pair of connecting straps 50 and 51 attach to the first side 14 of the sheet 12 for detachably connecting a lapboard 52 to the sheet, as better discussed below with regard to other views of the present invention. The connecting straps 50, 51 are preferably comprised of a flexible nylon band or other strong flexible material.

The lapboard 52 is a substantially rectangular flat board having a writing surface layer 53 and a cushioning layer 54, which are laminated together. The writing surface layer 53 is sufficiently firm to provide a surface capable of supporting writing activity thereon. The writing surface layer 53 is preferably comprised of a rubber material. In an alternate embodiment, the writing surface layer 53 is an erasable plastic or metal surface for writing and erasing writing thereon. The cushioning layer 54 is preferably comprised of a softer material than the writing surface layer, such as closed cell sponge rubber, for cushioning the lapboard on a lap.

A medium pocket 56 and a small pocket 57 detachably engage a side 58 of the lapboard 52. The medium pocket 56 and the small pocket 57 are each preferably comprised of a fabric pouch for holding objects therein such as crayons, pencil sharpeners or even juice containers. A pair of fastener pads 59 and 60 attach in spaced-apart relation to an inside surface 61 of the medium pocket 56. A pair of fastener pads 62 and 63 attach to an inside surface 64 of the medium pocket which opposes the inside surface 61. The pads 59 and 60 align with and matingly engage the pads 62 and 63 respectively, for opening and closing the medium pocket 56.

The medium pocket 56 selectively attaches to the lapboard 52. A pair of pads 100 and 101, as shown in phantom in FIG. 4, attach to an outer surface of the medium pocket 56. A pair of pads 69 and 70, as shown in FIGS. 2–5, attach to the side 58 of the lapboard 52. The pads 100 and 101 matingly engage pads 69 and 70 respectively to selectively attach the medium pocket 56 to the lapboard 52.

The small pocket 57 includes a fastener pad 65 (shown in phantom) attached to an inside surface 66 of the small pocket. A pad 67 attaches to an inside surface 68 of the small pocket 57 that opposes the inside surface 66. The pad 65 aligns with and matingly engages the pad 67 for opening and closing the small pocket 57.

The small pocket 57 selectively attaches to the lapboard 52. A pad 102, as shown in phantom in FIG. 4, attaches to an outer surface of the small pocket 57. A pad 71, shown in FIGS. 2–5, attaches to the side 58 of the lapboard 52. The pad 102 matingly engages the pad 71 to selectively attach the small pocket 57 to the side 58 of the lapboard 52.

FIG. 2 is a front view of the portable organizer desk 10 illustrating the lapboard 52 in an upright position with the sheet 12 folded along the first fold line 36. The first fold line 36 defines a first panel 72 and a second panel 97 in the sheet 12. A pair of pads 73 and 74 (shown in phantom) attach to an edge portion of the sheet 12 on the second side 16 in the first panel 72. A pad 75 and a pad 76 (shown in FIG. 3) attach to the cushioning layer 54 of the lapboard 52. The pads 73 and 74 detachably engage pads 75 and 76 respectively for securing the lapboard 52 in an upright position to the edge portion of the first panel 72.

The connecting straps 50 and 51 are each of a length that allows the lapboard 52 to be moved between an extended position as illustrated in FIG. 1 and an upright position as illustrated in FIG. 2. In a preferred embodiment, the connecting straps 50 and 51 are comprised of nylon webbing. The connecting straps 50 and 51 each have a first pad 77 on a first side 79. For purposes of illustration, the strap 50 is partially folded back to show a second pad 78 on a second side 80. The strap 51 also includes a second pad on a second side similar to the second pad 78 on the strap 50. A pad 81 attaches to the cushioning layer 54 of the lapboard 52 and aligns with the second pad 78. The second pad 78 detachably engages pad 81. The pad 81 associated with the strap 51 is not illustrated.

A plurality of play pieces 82 attach to the lapboard 52. Each of the play pieces 82 is preferably comprised of a cloth-like material shaped in alphabet letters, numbers, geometric shapes, or a clock for example. At least one pad 83, shown in phantom, attaches to an exterior surface of each of the play pieces 82. In a preferred embodiment, the cushioning layer 54 of the lapboard 52 is covered in a material such as felt. Each of the pads 83 detachably engages the cushioning layer 54 of the lapboard 52 for selectively attaching the play pieces 82 to the lapboard.

A large pocket 106, a corner of which is visible in FIG. 2, attaches to the second panel 97 of the sheet 12 as described in further detail below. Three pads 85, 86 and 87, also shown in FIGS. 3–5, attach in spaced-apart relation to a side 84 of the lapboard 52 opposite side 58 of the lapboard, for purposes discussed below.

Figure 3:
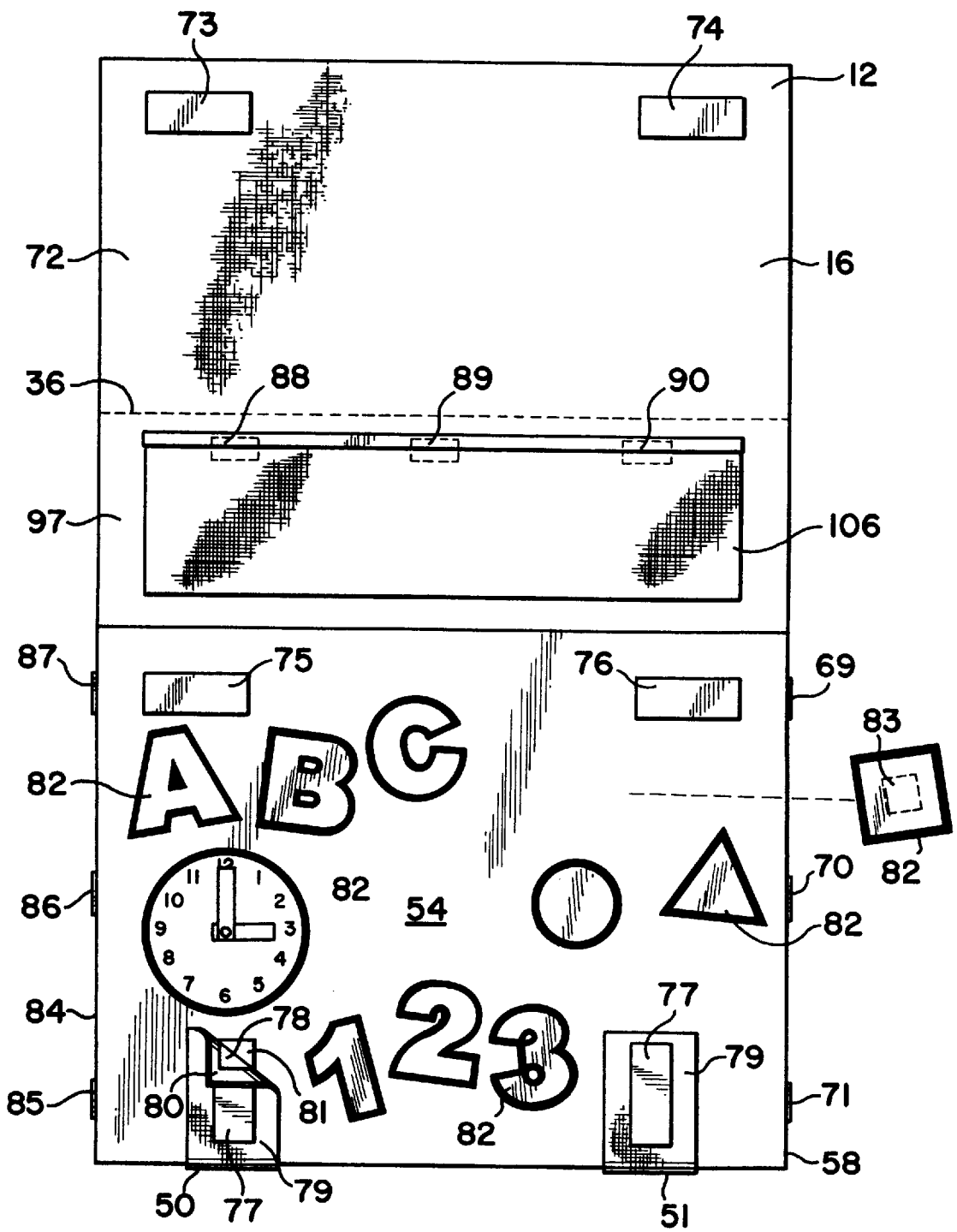
FIG. 3 is a front view of the portable organizer desk of FIG. 2 illustrating the sheet in an unfolded position.

FIG. 3 is a front view of the portable organizer desk 10 of FIG. 2 illustrating the sheet 12 in an unfolded position. The large pocket 106 is detachably engaged to the second side 16 of the sheet 12 on the second panel 97 as described in detail with reference to FIG. 4 below. The large pocket 106 is preferably comprised of a fabric pouch for holding elongated objects which are too long to fit into the small pocket 57 or the medium pocket 56. The preferred fabric for the large pocket 106 as well as the medium pocket 56, the small pocket 57 and the storage compartments 17 and 41 is a see-through mesh netting. Three pairs of mating fastener pads 88, 89 and 90 (shown in phantom) attach to opposing inside surfaces of the large pocket 106. Each respective pair of the mating fastener pads 88, 89 and 90 detachably engage one another for opening and closing the large pocket 106.

As described in detail above, FIG. 3 also shows the pads 73 and 74 for selectively detachably engaging either the pads 75 and 76 respectively or the pads 77. The first fold line 36 defines a separation between the first panel 72 and the second panel 97. The play pieces 82 are shown attached to the cushioning layer 54 of the lapboard 52. The three pads 69, 70 and 71 are shown attached to the side 58 of the lapboard 52. The three pads 85, 86 and 87 are shown attached to the side 84 of the lapboard 52.

Figure 4:
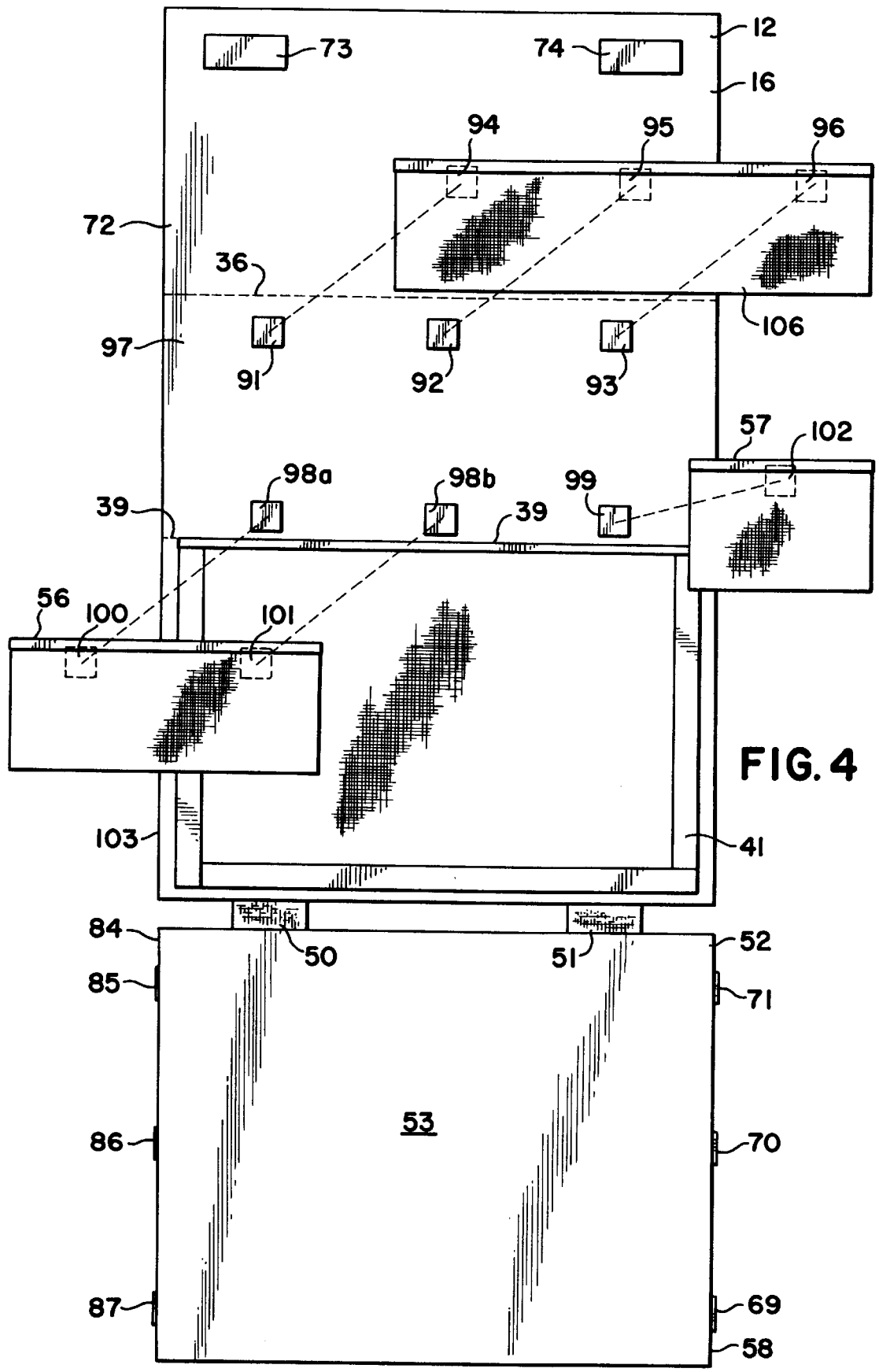
FIG. 4 is a front view of the portable organizer desk of FIG. 3 illustrating the lapboard in an extended position and a plurality of selectively attachable pockets exploded from the sheet.

FIG. 4 is a front view of the portable organizer desk 10 of FIG. 3 illustrating the lapboard 52 in the extended position. The small pocket 57, the medium pocket 56 and the large pocket 106 are exploded away from the sheet 12 to show selective attachment thereof to the sheet. Three pads 91, 92 and 93 attach in spaced-apart relation to the second side 16 of the sheet 12 on the second panel 97. Three pads 94, 95 and 96 (shown in phantom) attach to an exterior surface of the large pocket 106 for detachably engaging with the pads 91, 92 and 93 respectively in order to attach the large pocket to the second panel 97. The large pocket 106 may also be selectively attached to the side 84 of the lapboard 52 by detachably engaging the pads 94, 95 and 96 to the pads 85, 86 and 87.

Three pads 98a, 98b and 99 attach in spaced-apart relation to the second side 16 of the sheet 12 in the second panel 97 below the three pads 91, 92, and 93. The pads 100 and 101 (shown in phantom) of the medium pocket 56 detachably engage the pads 98a and 98b respectively to selectively attach the medium pocket 57 to the second panel 97 of the sheet 12. The pad 102 (shown in phantom) of the small pocket 57 detachably engages the pad 99 to selectively attach the medium pocket 57 to the second panel 97 of the sheet 12. As described in detail with reference to FIG. 1, the medium pocket 57 and the small pocket 56 may also be selectively attached to the lapboard 52 by attaching the pads 100, 101 and 102 to the pads 69, 70 and 71 respectively.

A second fold line 39 defines a third panel 103 in the sheet 12 adjacent the second panel 97. The large storage compartment 41, discussed in detail with reference to FIG. 1, attaches to the sheet 12 on the third panel 103. When attached to the pads 98a, 98b and 99 in the second panel 97 of the sheet 12, the medium pocket 56 and the small pocket 57 partially overlap the upper portion of the large storage compartment 41.

Figure 5:
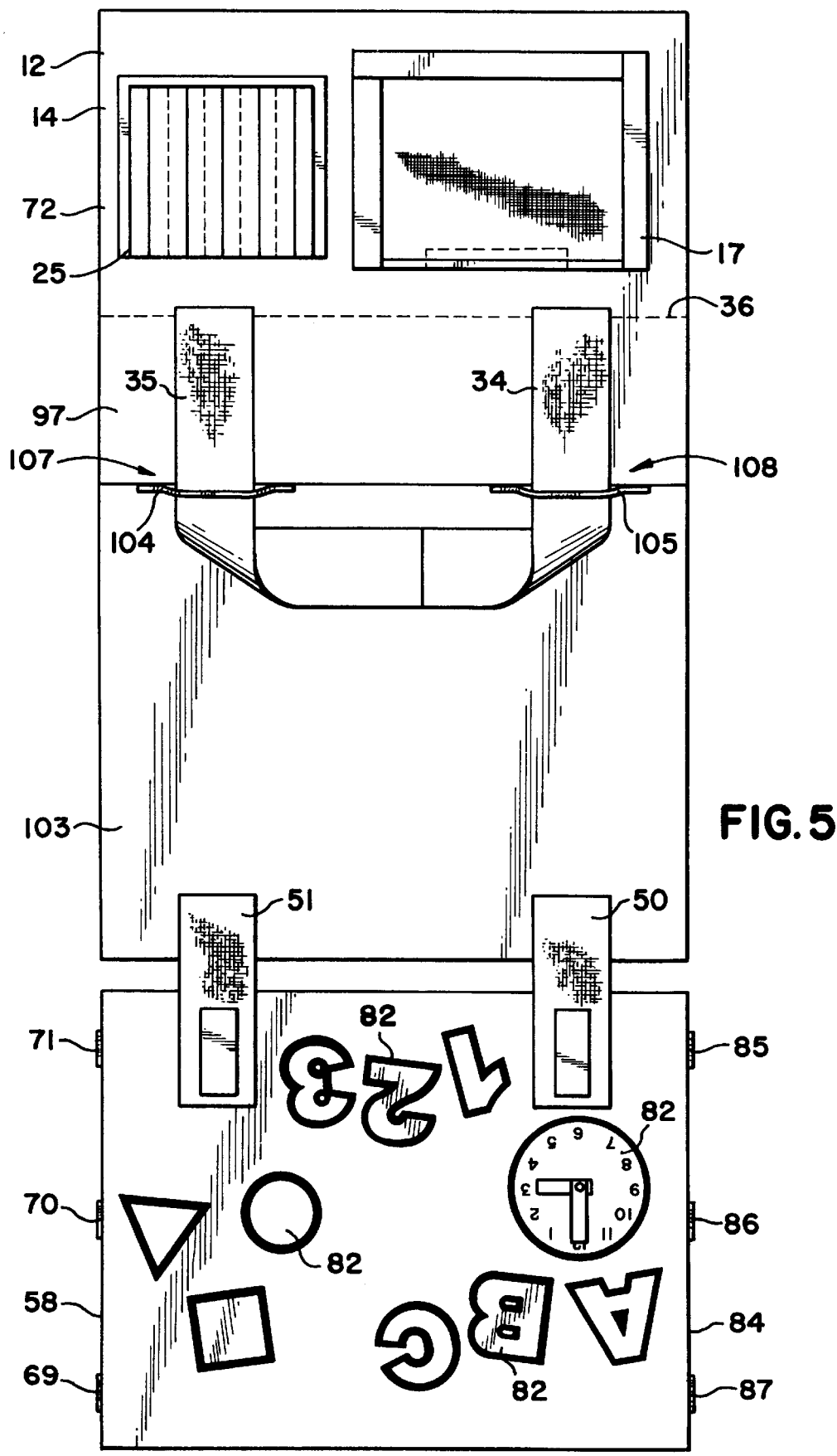
FIG. 5 is a rear view of the portable organizer desk of FIG. 4 illustrating a first side of the sheet and a cushioning surface of the lapboard with a plurality of play pieces selectively attached thereto.

FIG. 5 is a rear view of the portable organizer desk 10 shown in FIG. 4 illustrating the first side 14 of the sheet 12 and the cushioning layer 54 of the lapboard 52 with the play pieces 82 attached thereto. A pair of loops 104 and 105 attach in spaced-apart relation to the first side 14 of the sheet 12 to define the second fold line 39. Each of the loops 104, 105 is preferably comprised of nylon webbing. Each of the loops 104, 105 has two ends that are sewn to the first side 14 of the sheet 12 along the second fold line 39. An opening 107 is formed between the loop 104 and the first side 14 of the sheet 12. The opening 107 receives a distal end of the handle strap 35 therethrough. An opening 108 is similarly formed between the loop 105 and the first side 14 of the sheet 12. The opening 108 receives a distal end of handle strap 34 therethrough.

Figure 6:
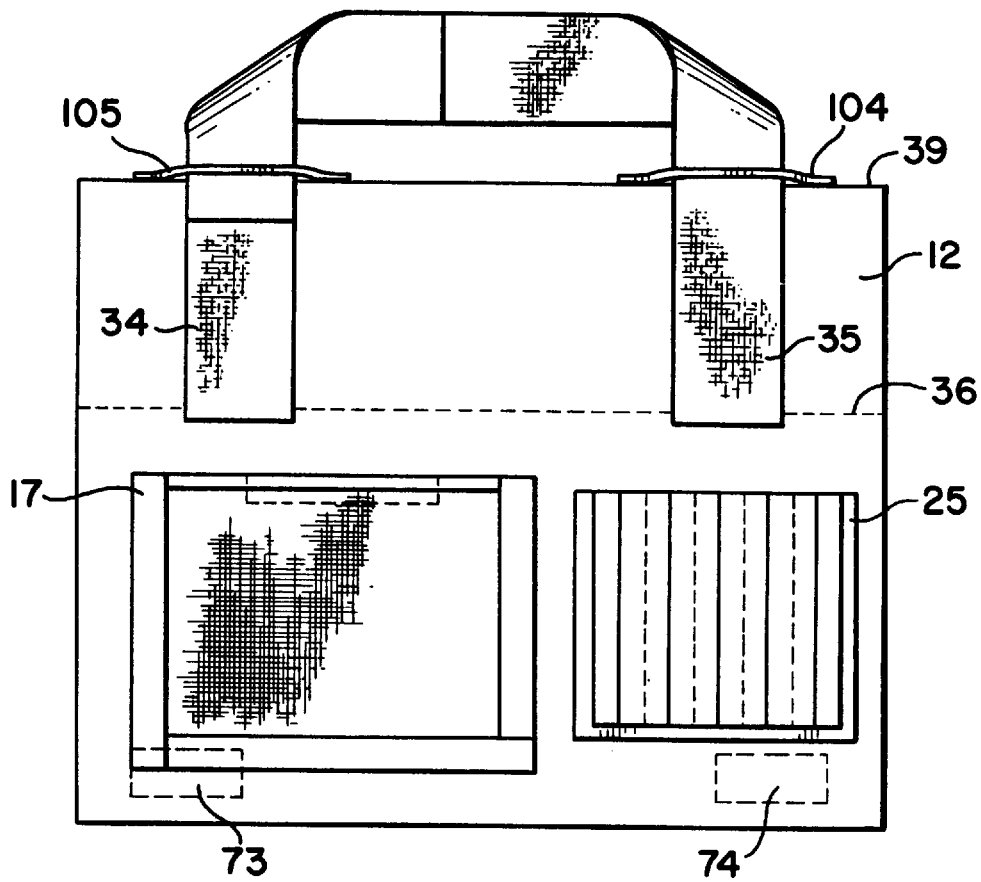
FIG. 6 is a front view of the portable organizer desk of FIG. 1, illustrating the sheet folded along a fold line opposite a pair of loops to substantially enclose the lapboard within the sheet, and thereby provide a compact sized package for carrying by a pair of handle straps.

FIG. 6 is a front view of the portable organizer desk 10 illustrating the sheet 12 folded along the second fold line 39. In this configuration, the lapboard 52 is substantially enclosed within the sheet 12. When carried by the handle straps 34, 35 in this configuration, the handle straps 34, 35 exert pressure against the loops 104, 105 at the second fold line 39 and against the sheet 12 at the first fold line 36 to distribute the weight of the portable organizer desk 10.

The operation of the portable organizer desk 10 is understood with reference to FIGS. 1–6. Beginning with FIG. 6, the portable organizer desk 10 is foldable into a compact size for carrying by the handle straps 34 and 35. In this configuration, the handle straps 34 and 35 pass through the loops 104 and 105 and cause the sheet 12 to fold along the second fold line 39 which divides the sheet substantially in half with the first panel 72 and the second panel 97 folded to one side of the second fold line and the third panel folded to the other side of the second fold line. The pads 73 and 74 engage the pads 77 to define the compact desk suitable for carrying like a briefcase.

The portable organizer desk 10 can be unfolded and installed in a car. With reference to FIG. 1, the handle straps 34 and 35 are separated by disengaging the pads 37 and 38 (shown in phantom in FIG. 2). The handle straps 34 and 35 are then backed out of the loops 104 and 105 and reattached to one another by re-engaging the pads 37 and 38 around the car seat head rest 40. The pads 73 and 74 are disengaged from the pads 77 such that the first panel 72 of the sheet 12 hangs freely from the first fold line 36. In this configuration, the portable organizer desk 10 hangs from the car seat head rest 40 into a back seat of a car. The lapboard 52 is hingeable between an upright position and an extended position as described earlier herein. In the upright position, shown in FIG. 2, the pads 73 and 74 engage the pads 75 and 76 to hold the lapboard 52 against the large storage compartment 41. In this configuration, interference by the portable organizer desk 10 with a passenger's entry or exit into the car is minimized as the portable organizer desk is substantially vertical and juxtaposed to the back of the car seat.

The lapboard 52 is also detachable from the sheet 12. By disengaging the pads 81 on the cushioning layer 54 of the lapboard 52 from the pads 78 on the carrying straps 50 and 51, the lapboard 52 is detached from the sheet 12. In this configuration, the lapboard 52 can be passed between passengers in the car or reversed to position the cushioning layer 54 upward such that a passenger can play with the play pieces 82 while the writing surface layer 53 rests against a lap.

As shown in FIG. 4, the pockets 56, 57 and 106 are easily moved between the second panel 97 in the sheet 12 and the sides 58 and 84 of the lapboard 52. The large pocket 106 is preferably moved by detachably engaging the pads 94, 95 and 96 to either the pads 91, 92 and 93 on the second panel 97 or the pads 85, 86 and 87 on the side 84 of the lapboard 52. However, the pads 94, 95 and 96 can also be engaged to the pads 98a, 98b and 99 respectively on the second panel 97 or the pads 69, 70 and 71 respectively on the side 58 of the lapboard 52. The medium pocket 56 is selectively placed on the sheet 12 or the lapboard 52 by detachably engaging the pads 100 and 101 to the pads 98a and 98b on the second panel 97 or the pads 69 and 70 on the side 58 of the lapboard 52. However, the medium pocket 56 is likewise selectively positioned in various places on the sheet 12 or the lapboard 52 by engaging the pads 100 and 101 to selected pairs of pads on the second panel 97 or on the sides 58 and 84 of the lapboard 52. The small pocket 57 is selectively positioned on the sheet 12 or the lapboard 52 by detachably engaging the pad 102 to mating pads; for example, to the pad 99 on the second panel 97 or to the pad 71 on the side 58 of the lapboard 52.

The portable organizer desk 10 is preferably removed from the car seat head rest 40 while the pads 73 and 74 are engaged to the pads 75 and 76 such that the lapboard 52 is held against the large storage compartment 41. The handle straps 34, 35 are then detached from one another by disengaging the pads 37 and 38 from one another. The handle straps 34 and 35 are passed through the loops 104 and 105 and the pads 37 and 38 re-engaged to one another. The pads 73 and 74 are disengaged from the pads 75 and 76 and engaged to the pads 77 on the carrying straps 50 and 51. Once removed from the car and placed into this configuration (seen in FIG. 6), the portable organizer desk 10 is thus converted into a compact-sized briefcase. It thus is seen that a new portable organizer desk for use while travelling is now provided that overcomes problems long associated with those of prior art. It should be understood however that many modifications, additions and deletions may be made thereto without departure from the spirit and scope of the invention as set forth in the following claims.

What is claimed is:

1. A portable organizer desk for use by a person while travelling in a car, comprising:

a sheet of a substantially planar flexible material having a first side and an opposing second side;

a pair of elongate handle straps spaced-apart from one another, each handle strap having a first end attached to the first side of the sheet on a first fold line substantially parallel to a transverse axis of the sheet, the first fold line defining a first panel and a second panel in the sheet, and each handle strap having a distal end adapted for detachable mating engagement to the distal end of the other handle strap;

a pair of loops spaced-apart from one another and attached to the first side of the sheet along a second fold line substantially parallel to the first fold line, each loop defining an opening between the first side and the loop for receiving one of the handle straps therethrough, the second fold line defining a third panel in the sheet and separating the second and third panels;

a pair of connecting straps spaced-apart from one another, each connecting strap having a first end attached to a side edge portion of the third panel and a distal end extending outwardly therefrom;

a plurality of pockets spaced-apart from one another and detachably connected to the second side of the sheet on the second and third panels, each of the pockets having a selectively openable entry for inserting and removing articles therefrom;

a lapboard detachably connected to the distal ends of the pair of connecting straps, the lapboard having an activity surface and an opposing padded surface for cushioning the weight of the lapboard, the pair of connecting straps permitting the lapboard to be selectively moved between a first position against the second side of the sheet in the third panel and a second position extending outwardly therefrom; and means for detachably securing the lapboard in the first position, whereby the lapboard is movable between the first and second positions while the sheet is hung from a headrest of a car by engaging the distal ends of the handle straps together and when the sheet is removed from the headrest, the lapboard can be substantially enclosed within the sheet and the desk carried by the handle straps extending through the loops.

2. The desk of claim 1 wherein a plurality of spaced-apart first pads are attached to the second side of the sheet and at least one second pad is attached to each pocket, each first pad having a surface of a first character and each second pad having a surface of a second character for detachable mating engagement with surfaces of the first character such that each pocket is detachably engaged to the second side of the sheet.

3. The desk of claim 2 wherein a plurality of spaced-apart third pads are attached to the lapboard, each third pad having a surface of a third character for detachable engagement with one of the second pads for detachably connecting the pockets to the lapboard.

4. The desk of claim 3 wherein a fourth pad having a surface of a fourth character is attached to the distal end of each connecting strap and the activity surface of the lapboard is comprised of a surface of a fifth character for mating engagement with the fourth pads.

5. The desk of claim 4 further comprising a plurality of playthings, each said plaything including a sixth pad having a surface of the sixth character attached to a surface of the plaything for detachable engagement with the fifth character surface of the lapboard.

6. The desk of claim 5 wherein the surfaces of the first, third, and fifth characters are the same and the surfaces of the second, fourth and sixth characters are the same.

7. The desk of claim 1 further comprising a storage compartment attached to the second side of the sheet in the third panel, the storage compartment having a selectively openable entry for inserting and removing articles therefrom.

8. The desk of claim 1 wherein the lapboard comprises a laminated body having a rigid layer and a cushion layer.

9. The desk of claim 1 further comprising a second sheet attached on three sides and on spaced apart lines to the first side of the sheet in the first panel to define a plurality of elongated slots between the second sheet and the first sheet for receiving elongate articles.

10. The desk of claim 1 further comprising a second storage compartment attached on three sides to the first side of the sheet in the first panel and open on a side facing the handle straps for receiving articles therein, the second storage compartment being adjacent the second sheet also attached to the first side of the sheet in the first panel.

* * * * *